No. 801,766. PATENTED OCT. 10, 1905.
W. CHURCHILL.
LENS.
APPLICATION FILED NOV. 5, 1904.
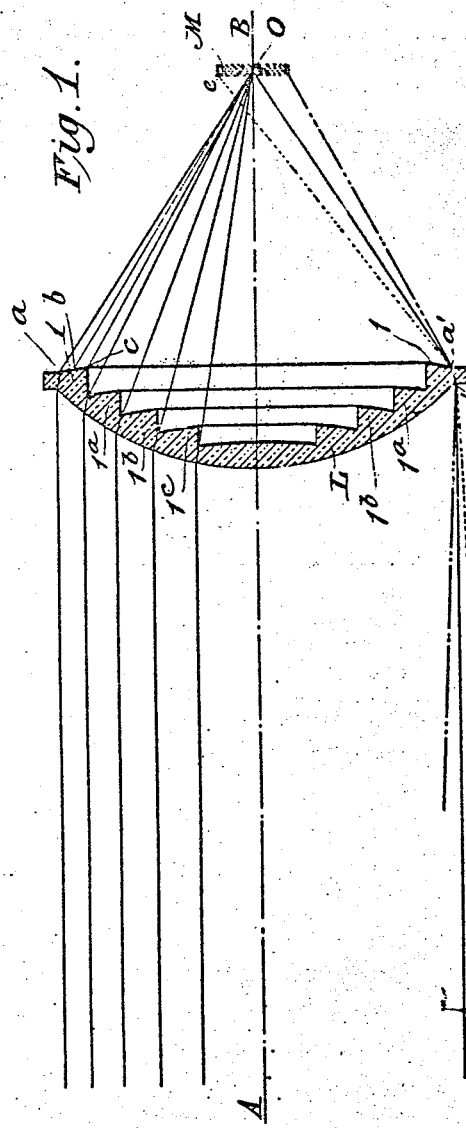
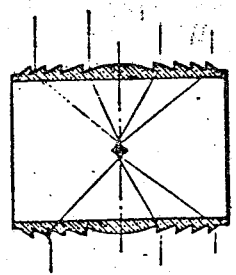

UNITED STATES PATENT OFFICE.

WILLIAM CHURCHILL, OF NEW BRITAIN, CONNECTICUT, ASSIGNOR TO CORNING GLASS WORKS, OF CORNING, NEW YORK.

LENS.

No. 801,768.   Specification of Letters Patent.   Patented Oct. 10, 1905.

Application filed November 5, 1904. Serial No. 231,505.

*To all whom it may concern:*

Be it known that I, WILLIAM CHURCHILL, a citizen of the United States, residing at New Britain, in the county of Hartford and State of Connecticut, have invented new and useful Improvements in Lenses, of which the following is a specification.

This invention relates to lenses of the Fresnel type, such as are employed more particularly in connection with railroad signal lamps and lanterns and with marine signal-lamps, whereby light-rays that have hitherto been lost by dispersion are caused to bend or be so refracted as to enter the beam of light projected by the lens and greatly increase the luminosity and penetrative power of the light.

In the accompanying drawings, Figure 1 is a diagrammatic view of a semaphore-lens of the usual type, showing also a burner-flame and rays of light emanating therefrom and passing through the lens. Fig. 2 is a similar view of a lens made in accordance with my improved method in connection with a flame and lines indicating rays of light. Fig. 3 is a view of a cylindrical lens, such as is used in marine service.

Similar reference characters indicate similar parts in the respective figures.

In order to render effective the light from a kerosene-lamp or other source of artificial illumination intended to serve as a signal, as is customary, for example, in railway and marine service, and at a greater range than is possible without some such device, it is customary to make use of a lens so constructed in accordance with the laws of optics as to bend a certain proportion of the light-rays emanated into a parallel bundle. In the type of Fresnel lens generally employed in the marine service the bending takes place only in such a way as to produce a fan of light thrown out toward the horizon. In a railroad-semaphore the bending of the rays is effected both as in the case of the marine Fresnel and also along a straight line, so that the result is to produce approximately a cylindrical bundle or beam of parallel rays having a cross-section of the size of the lens employed. In designing such lenses allowance is ordinarily made for the spherical aberration found in all lenses by altering the curvature of one or both faces of the lens at different points, since rays passing through the outer edges of the lens experience more spherical aberration than those passing nearer the center. The alteration referred to consists in dividing the surface of the lens into zones and reducing the curvature of each zone progressively from the center to the outer edge of the lens. The precise curvatures necessary depend, of course, upon the laws governing the refraction of light passing through a lens, and the curvatures vary, as is well known, according to the refractive index of the glass used and with the focal distance desired for the lens. In designing such lenses heretofore it has been customary to focus all parts of the lens as closely as possible to a theoretical point of light estimated to be situated in the center of the flame or other source of illumination.

A lens which focuses in all parts most closely to such theoretical point is most nearly perfect for use in an optical instrument, such as a microscope or a telescope, or for photographic purposes, and it has been supposed, apparently, that the same method would give the best results when applied to lenses intended to throw light serving as a signal in a certain path. There are, however, certain disadvantages in this method when used for railroad and marine purposes. In the first place, a large proportion of the area of the flame or other source of illumination employed is totally non-effective. As is well known in accordance with the law of optics, assuming that a certain point of the lens is focused at the center of the flame or very close to that point opposite the light which that portion of the lens is receiving from the center of the flame, it is also at the same time receiving rays from all other luminous points in the flame. Only the light which comes from the point in the flame to which the before-mentioned point in the lens is focused will be thrown in a precisely-parallel path—that is to say, a path parallel to the axis of the lens; but light impinging upon the lens from other parts of the flame at a less acute angle than the ray which is thrown parallel is bent in more or less closely to the axis of the lens, according as the angle at which it impinges upon the surface of the lens is farther from or nearer to the center of the flame, and, furthermore, light-rays impinging upon the same point of the lens at an angle more acute than the ray thrown parallel are spread out from the lens, diverging from the parallel beam at angles more or less acute as the light-rays involved emanate from points farther from or nearer to the center of the flame.

Such light-rays as are thrown out at a more acute angle to the surface of the lens than the parallel rays are, because of their dispersion, totally ineffective at any considerable distance from the lens. The light, however, which is thrown at an angle inside of the parallel ray, although focusing at some point more or less near to the lens, will be, or a large proportion of it at least, effective at considerable distances or as long as it remains within the light-beam.

When the flame to be placed behind the lens is relatively large, it is advisable to focus the central zone of the lens more closely to the center of the flame than in the case of the other zones—i. e., those more distant from the center.

Furthermore, all lenses pressed in molds, as is customary in the manufacture of railway-semaphores and Fresnel lenses for marine service, &c., are more or less liable to slight variation due to inequalities in the contraction of the glass upon cooling, such as a slight flattening of the curvature at any point, (and the defect involved is nearly always a flattening rather than an increase of curvature,) which inequality will throw the focus for that particular point back more or less from the center of the flame. The result of this defect will be that the adjustment between flame and lens will be more or less seriously deranged, and any flattening of curvature whatsoever will result in some loss of light.

To overcome the defects arising from previous methods of constructing and focusing lenses of the type hereinabove described, the present method has been devised, wherein instead of focusing to a point, as has heretofore been the custom, it has been assumed that a certain area of the flame is equally effective for purposes of illumination, the size of such area being dependent upon the size of flame available. The lens is then formed in such a way as to bring the foci for the different parts of each zone of the lens at various distances inside the plane of the illuminant—that is to say, between the flame and the lens. Now although there may be no light whatsoever at the theoretical focal point a line prolonged through this point from any given point upon the lens, provided it strikes the flame within the luminous area hereinbefore mentioned, will receive its full quota of luminous rays.

In Fig. 1 a lens L is shown, each zone 1 1ª, &c., of which is focused as closely as possible to the center O of the flame M. Since the spherical aberration present in any double-convex lens renders it impossible to focus any two points on the surface of the lens at the same point in the flame unless such points are located on equal radii from the axis A B of the lens, the desired result is obtained, approximately, by focusing one point—say a— upon the center of the flame and thereafter bringing the foci for other points close to the center. Thus if the point a in zone 1, Fig. 1, is focused at the center O of the flame M, the foci for the points b and c in the same zone will be close to the same center. The same may be said for the other zones.

In my improved method of construction instead of designing the curvatures of each zone so that the various points of such zone focus as closely as possible to the center of the flame, the outer edge of each zone is focused upon a point in the flame situated a certain distance on the side of the axis opposite the side upon which the point of such zone is located. This is illustrated in Fig. 2, in which it will be seen that the points $d$ $d'$, &c., on the outer edge of the zones 1 1ª, &c., are focused at different points on the axis A B, crossing which they converge on the luminous surface at D, a point outside the center O of the flame. In a circular lens, such as is represented in the diagram, the points D will describe a circular area with O as its center. The diameter of the luminous circular area will of course depend upon the size of the flame. If the luminous surface is large, the distance between the center O and the point D will be correspondingly increased. The entire luminous surface within the circular area will be available for illumination, as all the rays emanating therefrom will form less acute angles than the rays passing through the point D, and on emerging from the lens they will be bent more or less toward the axis A B. (See dotted lines $x$ $y$ $z$.) By giving the correct curvature to the several zones relative to the area of the illuminating-surface, practically all the light-rays passing through the lens will be parallel or convergent. Very few will diverge and be lost.

In the old method of constructing lenses, where the focus is at the center of the flame, all light-rays emanating from the luminous surface between its center and outer edge and passing across the axis of the lens are lost, inasmuch as they diverge from the axis. This is clearly shown in Fig. 1, where a light-ray from the point $e$ of the luminous surface crosses the axis A B to the point $a'$ on the zone 1 and thence through the lens in the path $x'$ $e'$. It is obvious, therefore, that light-rays emanating from one half of the flame or luminous surface will impinge upon any point of the lens at a more acute angle than that formed by rays emanating from the focus, and hence cause these rays to diverge.

Among the advantages gained by the use of my improved lens may be mentioned that a larger number of rays are thrown through the lens at any given point at an effective angle—that is to say, an angle which will insure their projection along the direction of the parallel beam—than is possible in previous methods of designing. This will be evident by reference to what has been said regarding the difference between the amount of luminous area involved in the two constructions shown by Figs. 1 and 2, respectively. Slight imperfections in the manufacture of the lens, as in contraction and flattening of curvature at any given point, are not so liable to impair the efficiency of the lens as has heretofore been the case, although at any given point where the curvature may become flattened there is still a certain amount of leeway, so to speak. In other words, a certain amount of flattening can take place and yet not throw the actual focus of any given point behind the center of the flame, for as the lens is constructed the focus is somewhat in front of the flame. According as the flame placed behind the lens is large or small more or less advantage may be taken of this principle. If the flame employed be a large one, the effect of the change will be more apparent. It has been found that in cases where this principle has been applied to the design of various lenses the result has been an increase of efficiency of the lens varying from twenty to thirty per cent., and this efficiency has been maintained not simply within close range of the lens, but at long distances, increasing the range of a light directly in proportion to the increase in the intensity of the beam thrown. This is partly due to the increased effective luminous area of the flame therein at any given point upon the lens and partly to the fact that the slight imperfections incident to manufacture are, under my invention, much less detrimental than formerly.

Under my invention the rays divergent on either side of the beam give to the signal a certain amount of spread and enable it to cover an angle of a few degrees upon each side of the axis. This is highly important in a railway-semaphore because the level of the engineer's eye is very seldom that of the signal, and it is therefore necessary that the signal should have a slight spread. In lenses heretofore designed much light has been lost by such spreading out of the rays close to the lens. In my lens they are rendered effective at a distance just where they are most needed.

The principles of construction herein described may be applied to the design of any lens whatsoever used in conjunction with a flame or other source of artificial illumination for the purpose of throwing light-rays as a signal at considerable distances.

Having thus described my invention, I claim—

1. A lens of the type described having a series of zones, each element of which is focused upon a different point in the axis of the lens, substantially as set forth.

2. A lens of the character described having a series of zones, each element of which is focused upon a different point in the axis of the lens and in front of a focal plane, substantially as set forth.

3. A lens of the character described having a series of zones, each element of which is focused upon a different point in the axis of the lens, the focal lines of said zones when projected across said axis converging on a definite plane or surface parallel to the plane or surface of the lens, substantially as set forth.

4. A lens in which the various parts or zones are focused upon various points of a definite luminous area whereby a maximum proportion of the light is thrown in a beam of parallel rays from the lens in the direction of its axis, and a maximum of the remaining rays are refracted convergently within the parallel beam, substantially as set forth.

In testimony whereof I affix my signature in presence of two witnesses.

WILLIAM CHURCHILL.

Witnesses:
GEORGE H. HOWARD,
C. B. BULL.